United States Patent
Jain et al.

(10) Patent No.: US 12,459,876 B2
(45) Date of Patent: Nov. 4, 2025

(54) ONE-STEP KIT-BASED SYNTHESIS OF 2-DEOXY-2-[$^{18}$F]FLUORO-D-SORBITOL

(71) Applicant: The Johns Hopkins University, Baltimore, MD (US)

(72) Inventors: Sanjay K. Jain, Baltimore, MD (US); Filipa Mota, Baltimore, MD (US); Alvaro A. Ordonez, Baltimore, MD (US)

(73) Assignee: The Johns Hopkins University, Baltimore, MD (US)

( * ) Notice: Subject to any disclaimer, the term of this patent is extended or adjusted under 35 U.S.C. 154(b) by 292 days.

(21) Appl. No.: 18/043,538

(22) PCT Filed: Aug. 27, 2021

(86) PCT No.: PCT/US2021/048019
§ 371 (c)(1),
(2) Date: Feb. 28, 2023

(87) PCT Pub. No.: WO2022/047202
PCT Pub. Date: Mar. 3, 2022

(65) Prior Publication Data
US 2023/0265024 A1    Aug. 24, 2023

Related U.S. Application Data

(60) Provisional application No. 63/071,755, filed on Aug. 28, 2020.

(51) Int. Cl.
*C07B 59/00*    (2006.01)

(52) U.S. Cl.
CPC ........ *C07B 59/005* (2013.01); *C07B 2200/05* (2013.01)

(58) Field of Classification Search
CPC ........................... C07B 2200/05; C07B 9/005
See application file for complete search history.

(56) References Cited

U.S. PATENT DOCUMENTS 11,268,958 B2 * 3/2022 Jain ................... G01N 33/5695
2015/0250906 A1    9/2015 Jain et al.

FOREIGN PATENT DOCUMENTS

WO    WO 2014/043606    3/2014
WO    WO 2021/187559    9/2021

OTHER PUBLICATIONS

Roethlisberger et al., "If Euhydric and Isotonic Do Not Work, What Are Acceptable pH and Osmolality for Parenteral Drug Dosage Forms?" Journal of Pharmaceutical Sciences vol. 106 pp. 446-456, DOI: 10.1016/j.xphs.2016.09.034 (Year: 2017).*
English machine translation of WO2021/187559, downloaded from worldwide.espacenet.com (Year: 2021).*
International Search Report and Written Opinion for PCT/US21/48019. Mailed Feb. 1, 2022. 10 pages.
(Continued)

*Primary Examiner* — Eric Olson
(74) *Attorney, Agent, or Firm* — Casimir Jones, S.C.; J. Mitchell Jones

(57) ABSTRACT

A self-contained kit and method for the on-demand synthesis of 2-deoxy-2-[$^{18}$F]fluoro-D-sorbitol ($^{18}$F-FDS) from commercially available 2-deoxy-2-[F$^{18}$]fluoroglucose ($^{18}$F-FDG) is disclosed.

17 Claims, 6 Drawing Sheets

(56) References Cited

OTHER PUBLICATIONS

Allott et al., Solid-supported cyanoborohydride cartridges for automation of reductive amination radiochemistry. Reaction Chemistry and Engineering 4, 2019; 1748-1751.
Basuli et al., Facile room temperature synthesis of fluorine-18 labeled fluoronicotinic acid-2,3,5,6-tetrafluorophenyl ester without azeotropic drying of fluorine-18. Nucl Med Biol. Dec. 2016;43(12):770-772.
Blaufox et al., The SNMMI and EANM practice guideline for renal scintigraphy in adults. Eur J Nucl Med Mol Imaging. Nov. 2018;45(12):2218-2228.
CDC. Antibiotic Resistance Threats in the United States, 2019. (Centers for Disease Control and Prevention 2019). 150 pages.
Cherry et al., Total-body imaging: Transforming the role of positron emission tomography. Sci Transl Med. Mar. 15, 2017;9(381):eaaf6169. 1-7.
Gowrishankar et al., Specific Imaging of Bacterial Infection Using 6"-18F-Fluoromaltotriose: A Second-Generation PET Tracer Targeting the Maltodextrin Transporter in Bacteria. J Nucl Med. Oct. 2017;58(10):1679-1684.
Hasegawa t al., Facile synthesis of 2-deoxy-2-[18F]fluorosorbitol using sodium borohydride on aluminum oxide. J. Label. Compd. Radiopharm. 2020; 64: 40-46.
Iaea. Imagine—general data overview. vol. 2021. Retrieved from the internet Apr. 19, 2023. 1 page.
Jain. The Promise of Molecular Imaging in the Study and Treatment of Infectious Diseases. Mol Imaging Biol. Jun. 2017; 19(3):341-347.
James et al., A molecular imaging primer: modalities, imaging agents, and applications. Physiol Rev. Apr. 2012;92(2):897-965.
Li et al., The synthesis of 18F-FDS and its potential application in molecular imaging. Mol Imaging Biol. Mar.-Apr. 2008;10(2):92-98.
Li et al., Validation of 2-18F-Fluorodeoxysorbitol as a Potential Radiopharmaceutical for Imaging Bacterial Infection in the Lung. J Nucl Med. Jan. 2018;59(1):134-139.
Liu et al., One-step (18)F labeling of biomolecules using organotrifluoroborates. Nat Protoc. Sep. 2015;10(9):1423-32.
Mota et al., Radiotracer Development for Bacterial Imaging. J Med Chem. Mar. 12, 2020;63(5):1964-1977.
Mutch et al., [11C]PABA: A PET tracer targeting bacteria-specific metabolism. ACS Infectious Diseases 2018; 4(7): 1067-1072.
O'Neill. Tackling Drug-resistant infections globally: Final report and Recommendations. The Review on Antimicrobial resistance. 2016. 84 pages.
Ordonez et al., A Systematic Approach for Developing Bacteria-Specific Imaging Tracers. J Nucl Med. Jan. 2017;58(1):144-150.
Ordonez et al., Imaging Enterobacterales infections in patients using pathogen-specific positron emission tomography. Sci Transl Med. Apr. 14, 2021;13(589):eabe9805. 1-22.
Ordonez et al., Molecular imaging of bacterial infections: Overcoming the barriers to clinical translation. Sci Transl Med. Sep. 4, 2019;11(508):eaax8251. 1-18.
Parker et al., Sensing Living Bacteria in Vivo Using d-Alanine-Derived 11C Radiotracers. ACS Cent Sci. Feb. 26, 2020;6(2):155-165.
Petrik et al., Imaging of Pseudomonas aeruginosa infection with Ga-68 labelled pyoverdine for positron emission tomography. Sci Rep. Oct. 24, 2018;8(1):15698. 1-9.
Polvoy et al., Nuclear Imaging of Bacterial Infection: The State of the Art and Future Directions. J Nucl Med. Dec. 2020;61(12):1708-1716.
Sellmyer et al., Bacterial infection imaging with [(18)F]fluoropropyl-trimethoprim. Proc Natl Acad Sci U S A. 2017; 114: 8372-8377.
Šljukić et al., Analytical monitoring of sodium borohydride. Analytical Methods, 2013, 5, 829-839.
Toyama et al., Current and future perspectives on functional molecular imaging in nephro-urology: theranostics on the horizon. Theranostics. Apr. 7, 2021;11(12):6105-6119.
Tucker et al., Noninvasive 11C-rifampin positron emission tomography reveals drug biodistribution in tuberculous meningitis. Sci Transl Med. Dec. 5, 2018;10(470):eaau0965. 1-23.
Van Der Born et al., Fluorine-18 labelled building blocks for PET tracer synthesis. Chem Soc Rev. Jul. 31, 2017;46(15):4709-4773.
Vilche et al., $^{68}$Ga-NOTA-UBI-29-41 as a PET Tracer for Detection of Bacterial Infection. J Nucl Med. Apr. 2016;57(4):622-7.
Wängler et al., One-step (18)F-labeling of peptides for positron emission tomography imaging using the SiFA methodology. Nat Protoc. Nov. 2012;7(11):1946-55.
Wängler et al., One-step $^{18}$F-labeling of carbohydrate-conjugated octreotate-derivatives containing a silicon-fluoride-acceptor (SiFA): in vitro and in vivo evaluation as tumor imaging agents for positron emission tomography (PET). Bioconjug Chem. Dec. 15, 2010;21(12):2289-96.
Weinstein et al., Imaging Enterobacteriaceae infection in vivo with 18F-fluorodeoxysorbitol positron emission tomography. Sci Transl Med. Oct. 22, 2014;6(259):259ra146. 1-20.
Werner et al., Functional Renal Imaging with 2-Deoxy-2-18F-Fluorosorbitol PET in Rat Models of Renal Disorders. J Nucl Med. May 2018;59(5):828-832.
Werner et al., Novel Functional Renal PET Imaging With 18F-FDS in Human Subjects. Clin Nucl Med. May 2019;44(5):410-411.
Werner et al., The next era of renal radionuclide imaging: novel PET radiotracers. Eur J Nucl Med Mol Imaging. Aug. 2019;46(9):1773-1786.
Yao et al., Infection Imaging With (18)F-FDS and First-in-Human Evaluation. Nucl Med Biol. Mar. 2016;43(3):206-14.
Zhang et al., Positron Emission Tomography Imaging with 2-[18F]F-p-Aminobenzoic Acid Detects *Staphylococcus aureus* Infections and Monitors Drug Response. ACS Infect Dis. Nov. 9, 2018; 4(11): 1635-1644.
Zhu et al., Biodistribution and Radiation Dosimetry of the Enterobacteriaceae-Specific Imaging Probe [(18)F]Fluorodeoxysorbitol Determined by PET/CT in Healthy Human Volunteers. Mol Imaging Biol. Oct. 2016;18(5):782-7.

\* cited by examiner

*FIG. 4*

ONE-STEP KIT-BASED SYNTHESIS OF 2-DEOXY-2-[$^{18}$F]FLUORO-D-SORBITOL

BACKGROUND 2-deoxy-2-[$^{18}$F]fluoro-D-sorbitol ($^{18}$F-FDS) is a bacteria-specific positron emission tomography (PET) radiotracer under development that will require fast, on-demand synthesis for maximal clinical impact. Conventional manufacture of $^{18}$F-FDS, however, requires dedicated infrastructure and personnel, which limits on-demand availability.

SUMMARY

In some aspects, the presently disclosed subject matter provides a method for preparing 2-deoxy-2-[$^{18}$F]fluoro-D-sorbitol ($^{18}$F-FDS), the method comprising: (a) providing an aliquot of 2-deoxy-2-[$^{18}$F]fluoro-D-glucose ($^{18}$F-FDG); (b) contacting the aliquot of $^{18}$F-FDG with a solid-supported borohydride source to form $^{18}$F-FDS; and (c) purifying the $^{18}$F-FDS. In certain aspects, the solid-supported borohydride source comprises a resin comprising triethylammonium methylpolystyrene borohydride (MP-Borohydride), (polystyrylmethyl)trimethylammonium borohydride, sodium borohydride on aluminum oxide, and combinations thereof.

In certain aspects, the aliquot of $^{18}$F-FDG comprises a dose ranging from about 150 MBq to about 1500 MBq of $^{18}$F-FDG. In particular aspects, the aliquot of $^{18}$F-FDG comprises a dose ranging from about 750 MBq to about 950 MBq of $^{18}$F-FDG.

In certain aspects, the resin comprises from about 150 mg to about 1,000 mg of the solid-supported borohydride source. In particular aspects, the resin comprises from about 300 to about 500 mg triethylammonium methylpolystyrene borohydride (MP-Borohydride).

In certain aspects, the method comprises purifying the $^{18}$F-FDS by contacting the $^{18}$F-FDS formed in step (b) with one or more resins selected from the group consisting of a cation exchanger, anion exchanger, neutral alumina, a reverse phase resin, and combinations thereof. In particular aspects, the cation exchanger comprises PS—H$^+$; the anion exchanger comprises PSHCO$_3$; the neutral alumina comprises ALOX N; and the reverse phase resin comprises a polystyrene/divinylbenezene copolymer.

In certain aspects, the purified $^{18}$F-FDS has a pH ranging from about 5.5 to about 8. In particular aspects, the purified $^{18}$F-FDS has a pH of about 6.

In certain aspects, the method is conducted at a temperature having a range between about 20° C. and about 50° C.

In certain aspects, the resin comprising triethylammonium methylpolystyrene borohydride (MP-Borohydride) is pre-equilibrated with water or an acidified aqueous solution. In some aspects, the acidified aqueous solution comprises acetic acid.

In certain aspects, the method further comprises adding an aliquot of glucose to the aliquot of $^{18}$F-FDG.

In certain aspects, the $^{18}$F-FDS has a radiochemical purity of greater than about 90%.

In certain aspects, the method has a greater than about 60% radiochemical yield.

In other aspects, the presently disclosed subject matter provides a kit comprising: (a) a synthesis cartridge comprising a solid-supported borohydride source; and (b) a purification cartridge comprising one or more resins selected from the group consisting of a cation exchanger, anion exchanger, neutral alumina, a reverse phase resin, and combinations thereof. In certain aspects, the solid-supported borohydride source is selected from the group consisting of a resin comprising triethylammonium methylpolystyrene borohydride (MP-Borohydride), (polystyrylmethyl)trimethylammonium borohydride, sodium borohydride on aluminum oxide, and combinations thereof.

In certain aspects, the kit further comprises instructions for use in preparing 2-deoxy-2-[$^{18}$F]fluoro-D-sorbitol ($^{18}$F-FDS) from 2-deoxy-2-[$^{18}$F]fluoro-D-glucose ($^{18}$F-FDG).

In particular aspects, the kit comprises: a synthesis cartridge comprising between about 150 mg to about 1,000 mg of the solid-supported borohydride source, wherein the synthesis cartridge is configured to be in fluid communication with a source of 2-deoxy-2-[$^{18}$F]fluoro-D-glucose ($^{18}$F-FDG) and in fluid communication with a purification cartridge comprising one or more resins selected from the group consisting of a cation exchanger, anion exchanger, neutral alumina, a reverse phase resin, and combinations thereof.

Certain aspects of the presently disclosed subject matter having been stated hereinabove, which are addressed in whole or in part by the presently disclosed subject matter, other aspects will become evident as the description proceeds when taken in connection with the accompanying Examples and Drawings as best described herein below.

BRIEF DESCRIPTION OF THE DRAWINGS

Figure 1:
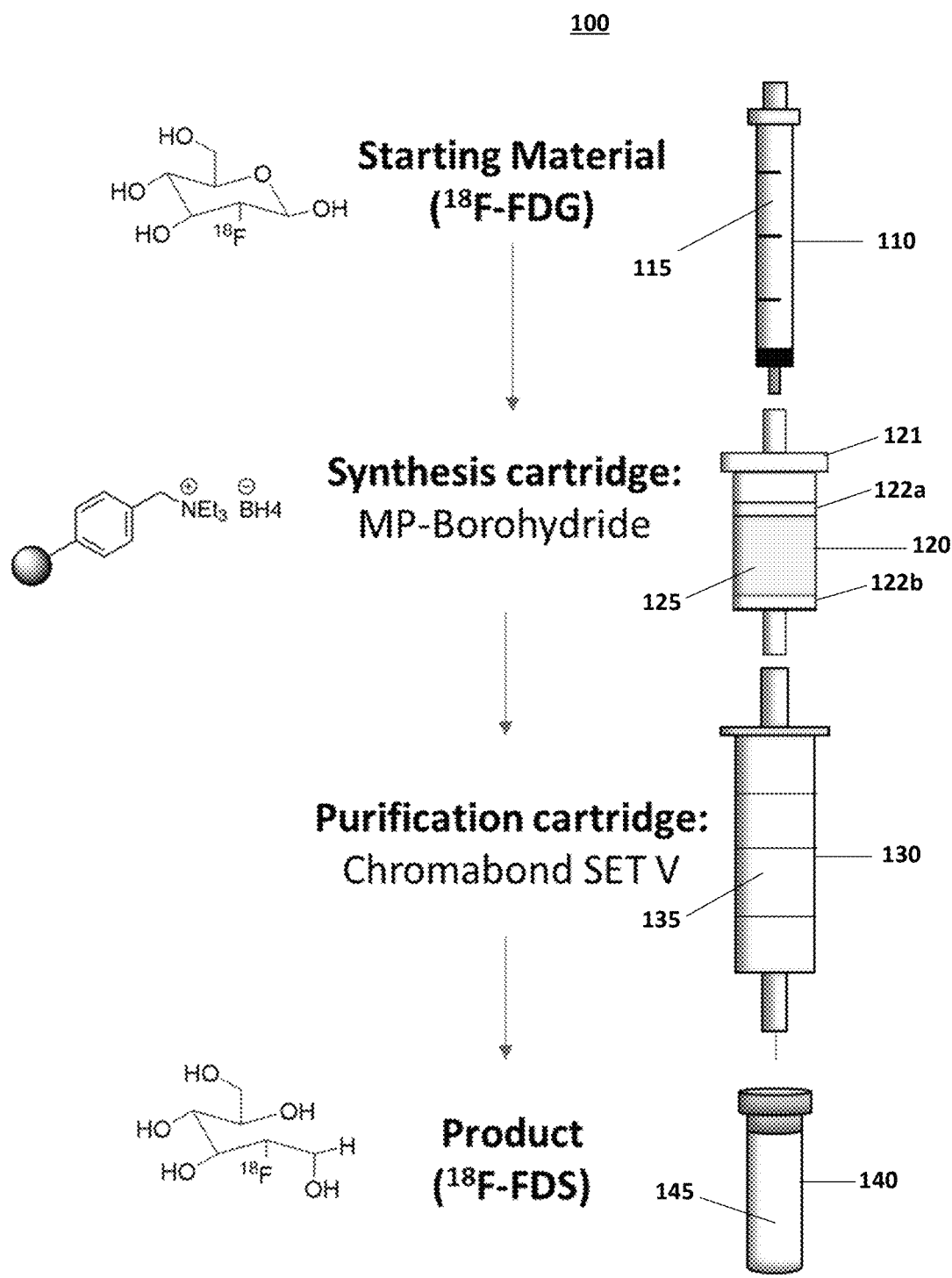

Having thus described the presently disclosed subject matter in general terms, reference will now be made to the accompanying Figures, which are not necessarily drawn to scale, and wherein:

FIG. 1 is a schematic representation of one embodiment of the presently disclosed solid-phase synthesis of $^{18}$F-FDS;

FIG. 2A, FIG. 2B, and FIG. 2C show one embodiment of the radio-TLC analysis of $^{18}$F-FDS synthesis. Representative chromatograms of starting material $^{18}$F-FDG (FIG. 2A), solid-phase synthesized $^{18}$F-FDS (FIG. 2B) in greater than 99% purity, and a mixture of both compounds as control (FIG. 2C);

FIG. 3a and FIG. 3b show $^{18}$F-FDS PET/CT imaging in patients with confirmed Enterobacterales infections. FIG. 3a) Three-dimensional maximum intensity projection (MIP) from a patient with microbiologically confirmed *Enterobacter aerogenes* cellulitis of the left breast. Signal also is noted in the heart (blood pool), liver, kidneys, and the urinary bladder. FIG. 3b) Three-dimensional MIP from a patient with multidrug-resistant, extended spectrum beta-lactamase (ESBL)-producing *E. coli* osteomyelitis before and after inadequate treatment. Yellow arrows indicate site of infection. Images reproduced with permission from Ordonez et al. Sci Transl Med. Copyright 2021 The American Association for the Advancement of Science;

FIG. 4a, FIG. 4b, and FIG. 4c are a schematic representation of one embodiment of the presently disclosed kit-based $^{18}$F-FDS synthesis. FIG. 4a) $^{18}$F-FDG is reduced to $^{18}$F-FDS by reacting with MP-Borohydride at room temperature. FIG. 4b) Schematics of the in-house developed borohydride cartridge and commercially available cation exchange cartridge (PS—H+). FIG. 4c) Borohydride and cation-exchange cartridges are pre-equilibrated with deionized water and connected in tandem with the borohydride cartridge on top. A solution of $^{18}$F-FDG is passed through the cartridges, followed by saline, to generate $^{18}$F-FDS;

FIG. 5a, FIG. 5b, FIG. 5c, and FIG. 5d show an embodiment of the radiochemical purity of $^{18}$F-FDS by radio-TLC. Representative radio-TLC chromatograms of starting $^{18}$F-FDG (FIG. 5a) and kit-generated $^{18}$F-FDS (FIG. 5b). (FIG.

5c) A mixture of both samples shows two distinct peaks by radio-TLC analysis. (FIG. 5d) Representative TLC of non-radioactive standards, FDG and FDS; and FIG. 6a and FIG. 6b are representative PET images obtained with $^{18}$F-FDS in hamster models of SARS-CoV-2 and K. pneumoniae co-infection. (FIG. 6a) Setup and timeline of the experiment. Hamsters were intranasally inoculated with SARS-CoV-2 (1.5×105 50% tissue culture infective dose) and disease progressed for 7 days, after which a secondary intratracheal infection with K. pneumoniae (ATCC 43816, 3 $\log_{10}$ colony forming units) was initiated. On day 9, anesthetized animals received $^{18}$F-FDS (7.39±1.50 MBq, n=6) intravenously and PET imaging was performed 120 minutes post-tracer injection to allow clearance of $^{18}$F-FDS from non-infected tissues. PET was acquired for 15 minutes, followed by CT. (FIG. 6b) Three-dimensional maximum intensity projection (MIP), transverse and coronal CT, and overlaid $^{18}$F-FDS PET in infected hamsters. Hamsters show $^{18}$F-FDS PET signal in the areas of K. pneumoniae pneumonia visible on CT. $^{18}$F-FDS signal also can be seen in the kidneys, gallbladder, and intestines. Quantification of the PET signal shows that the mean standard uptake values ($SUV_{mean}$) are significantly higher for areas of pneumonia compared to unaffected lung. Data represented as median and interquartile range. Statistical analyses were performed using a Mann Whitney U test. Images adapted and reproduced with permission from Ordonez et al. Sci Transl Med. Copyright 2021 The American Association for the Advancement of Science.

DETAILED DESCRIPTION

The presently disclosed subject matter now will be described more fully hereinafter with reference to the accompanying Figures, in which some, but not all embodiments of the inventions are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Figures. Therefore, it is to be understood that the presently disclosed subject matter is not to be limited to the specific embodiments disclosed and that modifications and other embodiments are intended to be included within the scope of the appended claims.

I. One-Step Kit-Based Synthesis of 2-Deoxy-2-[$^{18}$F]Fluoro-D-Sorbitol

The presently disclosed subject matter provides a self-contained kit for the on-demand synthesis of 2-deoxy-2-[$^{18}$F]fluoro-D-sorbitol ($^{18}$F-FDS) from commercially available 2-deoxy-2-[$^{18}$F]fluoroglucose ($^{18}$F-FDG). The presently disclosed method allows the formulation of $^{18}$F-FDS in less than 30 min by radiopharmacy staff having minimal training in radiopharmaceutical synthesis and without the need for specialized equipment. Thus, the presently disclosed method will facilitate the use of $^{18}$F-FDS positron emission tomography (PET) in routine clinical practice, especially for imaging infectious conditions.

Imaging technology in routine clinical practice is not able to distinguish infectious processes from oncologic or inflammatory ones. A novel positron emission tomography (PET) radiotracer has been previously developed that is rapidly and selectively metabolized by Enterobacteriales (e.g., gram negative bacteria including, but not limited to, E. coli, Klebsiella, Salmonella, and the like), which are the largest group of bacterial pathogens in humans and cost billions of dollars to the U.S. healthcare system annually. This radiotracer, 2-deoxy-2-[$^{18}$F]fluoro-D-sorbitol ($^{18}$F-FDS), has been investigated in first-in-human studies and was found to be safe and well tolerated and is able to specifically detect and localize infections over oncologic or sterile inflammatory lesions.

Following an initial clinical trial, feedback from clinical radiologists highlighted the need for on-demand formulation of $^{18}$F-FDS for maximum adoption in clinical practice. Methods known in the art for preparing $^{18}$F-FDS require either on-site cyclotron-generated $^{18}$F-fluoride or conversion of commercially available $^{18}$F-FDG in a temperature-controlled (35° C. to 55° C.) synthesis block. Since the majority of PET imaging centers worldwide do not have an on-site cyclotron (which is very expensive), the most practical approach to use commercially available $^{18}$F-FDG as the starting material.

$^{18}$F-FDG is the most widely used PET tracer and is generally available at sites that have a PET scanner. On-demand synthesis of $^{18}$F-FDS would allow same day (versus at the earliest next day with the currently available synthetic methods) imaging of patients afflicted with or suspected of being afflicted with an infection. This aspect is important as most patients afflicted with an infection, e.g., a bacterial infection, need more immediate diagnosis and treatment than more chronic conditions (e.g., most cancers).

Accordingly, the presently disclosed subject matter provides a self-contained kit that can synthesize, purify, and formulate $^{18}$F-FDS for human administration in less than 10 minutes. In contrast to synthetic methods known in the art, the presently disclosed chemical process is optimized for room temperature synthesis and, due to its simplicity, does not require any other specialized equipment or radiochemistry training, therefore maximizing its adoption potential in clinical practice.

More particularly, the presently disclosed subject matter provides a kit-based solid-phase method for synthesizing $^{18}$F-FDS that uses commercially available 2-deoxy-2-[$^{18}$F]fluoro-D-glucose ($^{18}$F-FDG) as the precursor and allows $^{18}$F-FDS to be produced and purified in a one-step method in less than 10 min at room temperature.

Referring now to FIG. 1, is kit 100 for the solid-phase synthesis of $^{18}$F-FDS. Kit 100 comprises vessel 110 comprising starting material 115, e.g., 2-deoxy-2-[$^{18}$F]fluoro-D-glucose ($^{18}$F-FDG). The $^{18}$F-FDG starting material can include a dose ranging from about 150 MBq to about 1500 MBq of $^{18}$F-FDG, including about 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 935, 950, 955, 960, 965, 970, 975, 980, 985, 990, 995, a1000, 1005, 1010, 1015, 1020, 1025, 1030, 1035, 1040, 1045, 1050, 1055, 1060, 1065, 1070, 1075, 1080, 1085, 1090, 1095, 1100, 1105, 1110, 1115, 1120, 1125, 1130, 1135, 1140, 1145, 1150, 1155, 1160, 1165, 1170, 1175, 1180, 1185, 1190, 1195, 1200, 1205, 1210, 1215, 1220, 1225, 1230, 1235, 1240, 1245, 1250, 1255, 1260, 1265, 1270, 1275, 1280, 1285, 1290, 1295, 1300, 1305, 1310, 1315, 1320, 1325, 1330, 1335, 1340, 1345, 1350, 1355, 1360, 1365, 1370, 1375, 1380, 1385, 1390, 1395, 1400, 1405, 1410, 1415, 1420, 1425, 1430, 1435, 1440, 1445, 1450, 1455, 1460, 1465, 1470, 1475, 1480, 1485, 1490, 1495, and 1500 MBq.

Referring again to FIG. 1, vessel 110 can be any vessel suitable for containing starting material 115, including, but not limited to, a syringe, a cartridge, or other suitable container or receptacle. Vessel 110 is coupled, for example, with fitting 121, e.g., a Luer fitting, or otherwise in fluid communication with synthesis cartridge 120. Synthesis cartridge 120 contains reagent 125. In some embodiments, reagent 125 is packed between frits 122a and 122b, which leaves some space at the top of synthesis cartridge 120 for expansion of reagent 125 upon pre-conditioning. In particular embodiments, reagent 125 comprises macroporous triethylammonium methylpolystyrene borohydride (MP-borohydride).

The amount of MP-borohydride included in synthesis cartridge 120 can vary depending on the initial dosage of the $^{18}$F-FDG starting material. For example, when starting with less than about 370 MBq of $^{18}$F-FDG, a cartridge containing about 300 mg of MP-borohydride could be used. In other embodiments, when starting with up to about 925 MBq, a cartridge containing about 500 mg of MP-borohydride can be used. Importantly, in both cases, these conditions produced $^{18}$F-FDS with greater than 90% radiochemical purity. Thus, synthesis cartridge 120, can contain from about 150 mg to about 1,000 mg of MP-borohydride, including 150, 160, 170, 180, 190, 200, 210, 220, 230, 240, 250, 260, 270, 280, 290, 300, 310, 320, 330, 340, 350, 360, 370, 380, 390, 400, 410, 420, 430, 440, 450, 460, 470, 480, 490, 500, 510, 520, 530, 540, 550, 560, 570, 580, 590, 600, 610, 620, 630, 640, 650, 660, 670, 680, 690, 700, 710, 720, 730, 740, 750, 760, 770, 780, 790, 800, 810, 820, 830, 840, 850, 860, 870, 880, 890, 900, 910, 920, 930, 940, 950, 960, 970, 980, 990, and 1000 mg of MP-borohydride.

Referring once again to FIG. 1, synthesis cartridge 120 is coupled, e.g., with a Luer fitting, or otherwise in fluid communication with purification cartridge 130. Purification cartridge 130 comprises resin 135 for removing unwanted byproducts and/or unreacted reagents from synthesis cartridge 120. Purification cartridge 130 can include, for example, a CHROMABOND© SET V solid-phase extraction (SPE) cartridge. In such embodiments, resin 135 can include, for example, a series of resins, such as, a cation exchanger (PS—H$^+$), anion exchanger (PSHCO$_3$), neutral alumina (ALOX N) and a reverse phase resin, e.g., highly porous polystyrene/divinylbenezene copolymer (HR-P). Product 145, e.g., $^{18}$F-FDS, can be collected in vessel 140, e.g., a vial, which is in fluid communication with purification cartridge 130. Vessel 140 can be provided with kit 100 or optionally can be provided by the end user.

Accordingly, in some embodiments, the presently disclosed subject matter provides a method for preparing 2-deoxy-2-[$^{18}$F]fluoro-D-sorbitol ($^{18}$F-FDS), the method comprising: (a) providing an aliquot of 2-deoxy-2-[$^{18}$F] fluoro-D-glucose ($^{18}$F-FDG); (b) contacting the aliquot of $^{18}$F-FDG with a solid-supported borohydride source to form $^{18}$F-FDS; and (c) purifying the $^{18}$F-FDS. In certain embodiments, the solid-supported borohydride source comprises a resin comprising triethylammonium methylpolystyrene borohydride (MP-Borohydride). In other embodiments, the solid-supported borohydride source comprises a (polystyrylmethyl)trimethylammonium borohydride, e.g., Borohydride on Amberlite® IRA-400. In other embodiments, the solid-supported borohydride source comprises sodium borohydride on aluminum oxide.

In certain embodiments, the aliquot of $^{18}$F-FDG comprises a dose ranging from about 150 MBq to about 1500 MBq of $^{18}$F-FDG. In particular embodiments, the aliquot of $^{18}$F-FDG comprises a dose ranging from about 750 MBq to about 950 MBq of $^{18}$F-FDG.

In certain embodiments, the resin comprises from about 150 mg to about 1,000 mg of triethylammonium methylpolystyrene borohydride (MP-Borohydride). In particular embodiments, the resin comprises from about 300 to about 500 mg triethylammonium methylpolystyrene borohydride (MP-Borohydride).

In certain embodiments, the method comprises purifying the $^{18}$F-FDS by contacting the $^{18}$F-FDS formed in step (b) with one or more resins selected from the group consisting of a cation exchanger, anion exchanger, neutral alumina, a reverse phase resin, and combinations thereof. In particular embodiments, the cation exchanger comprises PS—H$^+$; the anion exchanger comprises PSHCO$_3$; the neutral alumina comprises ALOX N; and the reverse phase resin comprises a polystyrene/divinylbenezene copolymer.

In certain embodiments, the purified $^{18}$F-FDS has a pH ranging from about 5.5 to about 8, including 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, and 8.0. In particular embodiments, the purified $^{18}$F-FDS has a pH of about 6.

In some embodiments, the method is conducts at a temperature range between about 20° C. and about 50° C., including 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, and 50° C. In certain embodiments, the method is conducted at room temperature. As used herein, "room temperature" has a range between about 20° C. and about 25° C., including about 20, 21, 22, 23, 24, and 25° C.

In certain embodiments, the resin comprising triethylammonium methylpolystyrene borohydride (MP-Borohydride) is pre-equilibrated with water or an acidified aqueous solution. In some embodiments, the acidified aqueous solution comprises acetic acid.

In certain embodiments, the method further comprises adding an aliquot of glucose to the aliquot of $^{18}$F-FDG.

In certain embodiments, the $^{18}$F-FDS has a radiochemical purity of greater than about 90%.

In certain embodiments, the method has a greater than about 60% radiochemical yield.

In other embodiments, the presently disclosed subject matter provides a kit comprising: (a) a synthesis cartridge comprising a solid-supported borohydride source; and (b) a purification cartridge comprising one or more resins selected from the group consisting of a cation exchanger, anion exchanger, neutral alumina, a reverse phase resin, and combinations thereof.

In certain embodiments, the solid-supported borohydride source comprises a resin comprising triethylammonium methylpolystyrene borohydride (MP-Borohydride).

In certain embodiments, the kit further comprises instructions for use in preparing 2-deoxy-2-[$^{18}$F]fluoro-D-sorbitol ($^{18}$F-FDS) from 2-deoxy-2-[$^{18}$F]fluoro-D-glucose ($^{18}$F-FDG).

In particular embodiments, the kit comprises: a synthesis cartridge comprising between about 150 mg to about 1,000 mg of a resin comprising triethylammonium methylpolystyrene borohydride (MP-Borohydride), wherein the synthesis cartridge is configured to be in fluid communication with a source of 2-deoxy-2-[$^{18}$F]fluoro-D-glucose ($^{18}$F-FDG) and in fluid communication with a purification cartridge comprising one or more resins selected from the group consisting of a cation exchanger, anion exchanger, neutral alumina, a reverse phase resin, and combinations thereof.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments 0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

EXAMPLES

The following Examples have been included to provide guidance to one of ordinary skill in the art for practicing representative embodiments of the presently disclosed subject matter. In light of the present disclosure and the general level of skill in the art, those of skill can appreciate that the following Examples are intended to be exemplary only and that numerous changes, modifications, and alterations can be employed without departing from the scope of the presently disclosed subject matter. The synthetic descriptions and specific examples that follow are only intended for the purposes of illustration, and are not to be construed as limiting in any manner to make compounds of the disclosure by other methods.

Example 1

Standard Synthesis of $^{18}$F-FDS

Methods known in the art for synthesizing $^{18}$F-FDS include either reducing commercially available $^{18}$F-FDG with sodium borohydride in solution with heat (35° C. to 50° C.) or from cyclotron-generated aqueous $^{18}$F-fluoride. In this example, a protocol adopted for the pre-clinical evaluation of $^{18}$F-FDS was carried out as a standard synthesis. Weinstein et al., 2014. In brief, commercially available $^{18}$F-FDG is used as the precursor and reduced with sodium borohydride for 30 min at 35° C. The identity and purity of $^{18}$F-FDS are confirmed by performing radio-TLC analysis.

Example 2

Synthesis of $^{18}$F-FDS Using MP-Borohydride

The first step in developing the presently disclosed solid-phase method to synthesize $^{18}$F-FDS was to find the appropriate reagent. Since sodium borohydride disintegrates in solution it is not ideal for solid-phase synthesis. Macroporous triethylammonium methylpolystyrene borohydride (MP-Borohydride) was selected as the reagent. In brief, MP-borohydride is a positively charged material with bound negatively charged borohydride. The bound borohydride is a versatile reducing agent. To determine if MP-borohydride could reduce $^{18}$F-FDG to $^{18}$F-FDS, a molar equivalent of sodium borohydride using the standard reduction conditions was initially attempted. In solution, complete reduction of $^{18}$F-FDG was achieved in 30 min, both at 35° C. and at room temperature.

Example 3

Solid-Phase Synthesis of $^{18}$F-FDS

Figure 2:
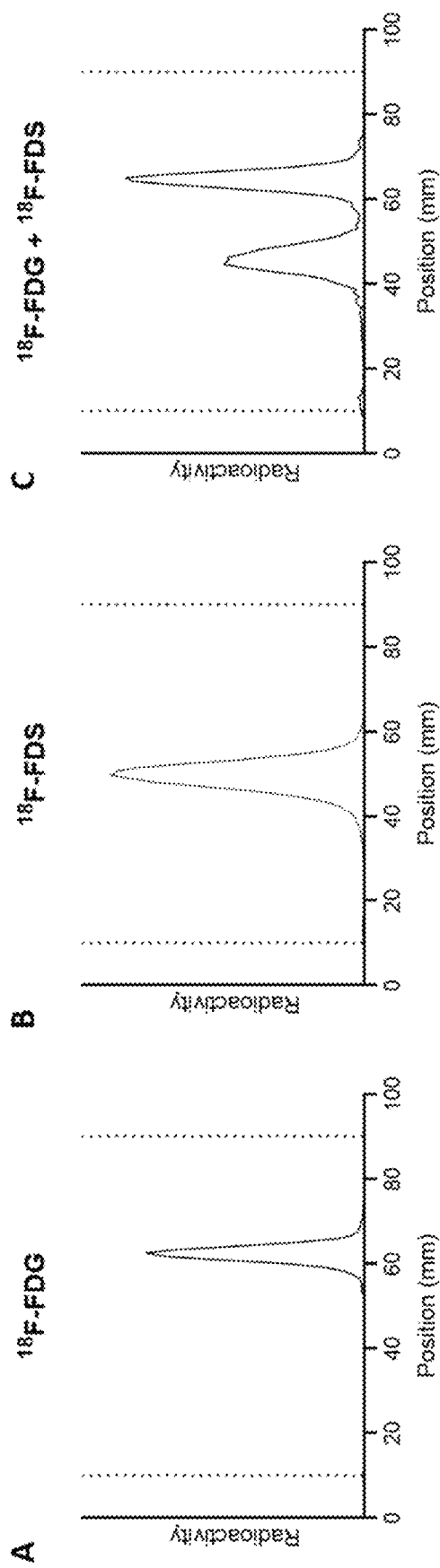

Solid-phase cartridges were prepared with varying amounts of MP-borohydride (Table 1). Cartridges containing 300 mg of MP-borohydride produced $^{18}$F-FDS with greater than 90% radiochemical purity (n=8) when starting with less than 370 MBq of $^{18}$F-FDG. The yields, however, were reduced when using higher doses of $^{18}$F-FDG. A larger cartridge containing 500 mg of reagent was found suitable to produce $^{18}$F-FDS in greater than 90% yield when starting with up to 925 MBq. Since the resin, e.g., MP-borohydride, expands when wet, it was found to be important to not fill the cartridge completely. The solid phase is packed between two frits, leaving some space at the top of the cartridge for expansion of the resin upon pre-conditioning. Solid-phase cartridge synthesis of $^{18}$F-FDS was successfully achieved at room temperature in less than 5 min. Specific activity and cartridge pre-equilibration did not affect the reaction. The radiochemical identity and purity of $^{18}$F-FDS were confirmed by radio-TLC (FIG. 2).

TABLE 1

Reaction conditions for solid-phase synthesis of $^{18}$F-FDS.

| Conditions | Amount of MP-borohydride (mg) | Cartridge pre-equilibration or sample modifications | Starting material: $^{18}$F-FDG Activity[a] (mCi) | Activity[a] (MBq) | Volume (mL) | pH | Product: $^{18}$F-FDS % Eluted[b] | Radiochemical purity (%) |
|---|---|---|---|---|---|---|---|---|
| 1 | 32 | — | 7.49 | 277 | 1 | 8 | 68 | <50 |
| 2 | 100 | — | 7.68 | 284 | 1 | 9 | 86 | 71 |
| 3 | 200 | — | 4.76 | 176 | 1 | 9 | 78 | 98 |
| 4 | 200 | — | 7.86 | 291 | 1 | 8 | 80 | 92 |
| 5 (n = 3) | 300 | Pre-equilibrated with water (2 mL) | 3.32 ± 1 | 123 ± 37 | 1 | 8-10 | 83 ± 7 | >99 |
| 6 | 300 | Pre-equilibrated with 1 % acetic acid, pH 3 (2 mL) | 2.63 | 97 | 1 | 8 | 89 | 95 |
| 7 (n = 2) | 300 | — | 8.19 ± 0.16 | 303 ± 6 | 1 | 8 | 87 ± 2 | 98 ± 2 |
| 8 | 300 | Added 2 mg Glucose to $^{18}$F-FDG | 7.99 | 296 | 1 | 8 | 91 | 99 |
| 9 | 300 | Added 4 mg Glucose to $^{18}$F-FDG | 8.22 | 304 | 1 | 8 | 91 | 99 |
| 10 | 300 | — | 10.68 | 395 | 1 | 9 | 79 | 33 |
| 11 | 300 | — | 10.5 | 372 | 2 | 9 | 96 | 52 |
| 12 | 300 | — | 10.94 | 405 | 3 | 9 | 96 | 52 |
| 13 | 500 | Pre-equilibrated with water (2 mL) | 7.95 | 294 | 1.4 | 10 | 90 | >99 |
| 14 (n = 3) | 500 | Pre-equilibrated with water (2 mL) | 10.49 ± 0.82 | 388 ± 30 | 1-2 | 10 | 82 ± 6 | >99 |
| 15 | 500 | Pre-equilibrated with water (2 mL) | 24.69 | 914 | 3.7 | 10 | 95 | >99 |

[a]Decay-corrected to time of delivery.
[b]Calculated as activity eluted/(activity eluted + activity retained in cartridge).

Example 4

Kit-Based Synthesis of Clinical Doses of $^{18}$F-FDS

Administration of $^{18}$F-FDS, e.g., via injections, in humans is typically performed with a minimum dose of 370 MBq. Thus, the presently disclosed kit synthesis was optimized to start with 925 MBq of $^{18}$F-FDG, which is the maximum single dose commercially available. After determining that 500 mg of reagent was sufficient to obtain greater than 90% radiochemical purity at clinical doses, purification and formulation of the radiotracer was optimized. The chemical reduction of $^{18}$F-FDG into $^{18}$F-FDS results in an increase in pH, which when using clinical doses led to pH 10. Ideally, the pH for clinical use would have to be in the 5.5 to 8 range. Since it is preferable to minimize manual transfer of liquids and obtain a simple synthesis and purification, the standard way of optimizing pH (by adding acid) was not an option. Thus, a second cartridge was used for purification and formulation. Commonly used purification cartridges, e.g., Sep-Pak alumina and chromafix cartridges, however, did not reduce the pH of the sample. A CHROMABOND© SET V cartridge was found to reduce pH to 6 consistently. When starting with 857±80 MBq of $^{18}$F-FDG, 523±68 MBq of $^{18}$F-FDS were eluted, resulting in greater than 60% radiochemical yield, with greater than 90% radiochemical purity (n=3).

Example 5

Methods

5.1 Solid-Phase Cartridge Synthesis of 2-deoxy-2-[$^{18}$F]fluorosorbitol ($^{18}$F-FDS)

Solid-phase extraction (SPE) tubes (1 mL and 2 mL) were fitted with a frit (20 μm porosity) at the bottom, packed with the required amount of MP-borohydride and fitted with another frit on top. The packed SPE tubes were then capped with a female Luer fitting. In some experiments, the cartridge was pre-equilibrated (flushed) with 2 mL of water or acidified aqueous solution. A syringe containing $^{18}$F-FDG was fitted at the top of the cartridge and manually eluted at a flow rate of approximately 1 mL/min. In some experiments, cold glucose was added to the sample. A second syringe containing water (1 mL) was used to flush the cartridge. Radiochemical purity was measured by radio-thin-layer chromatography.

5.2 Kit-Based Synthesis of Clinical Doses of $^{18}$F-FDS

SPE tubes (2 mL) were fitted with a frit (20-μm porosity) at the bottom, packed with 500 mg of MP-borohydride and fitted with another frit on top. The packed SPE tubes were then capped with a female Luer fitting. The synthesis cartridge was pre-conditioned with 2 mL of water and the purification cartridge (CHROMABOND© SET V) was preconditioned with 10 mL of ethanol and 30 mL of water.

The synthesis cartridge was fit on top of the purification cartridge. A syringe containing $^{18}$F-FDG was fitted at the top of the synthesis cartridge and the sample manually loaded onto the cartridges over 5 min. A second syringe containing 20 mL of sterile saline was used to flush the cartridges. The first 10 mL can be discarded and the second 10 mL, which contain $^{18}$F-FDS collected into a sealed vented vial. Radiochemical purity was assessed by radio-TLC.

thesis with limited infrastructure and personnel. To meet this demand, the presently disclosed subject matter provides a kit-based solid phase method that uses commercially and widely available 2-deoxy-2-[$^{18}$F]fluoro-$_D$-glucose ($^{18}$F-FDG) as the precursor and allows $^{18}$F-FDS to be produced and purified in one step at room temperature. The $^{18}$F-FDS kit consists of a solid phase extraction cartridge packed with solid supported borohydride (MP-borohydride), which can be attached to a second cartridge to reduce pH. The effects of different solid supported borohydride reagents, cartridge

TABLE 2

Kit-based synthesis of clinical doses of $^{18}$F-FDS

| | Starting material: $^{18}$F-FDG | | | | Product: $^{18}$F-FDS | | | |
|---|---|---|---|---|---|---|---|---|
| Reaction # | Activity$^a$ (mCi) | Activity$^a$ (MBq) | Volume (mL) | pH | Activity eluted (mCi) | Activity eluted (MBq) | Radiochemical yield (%, non-decay corrected) | Radiochemical purity (%) |
| 1 | 23.6 | 873.2 | 2.6 | 6 | 14.17 | 524.29 | 60 | 96 |
| 2 | 25.6 | 947.2 | 1.9 | 6 | 16.41 | 607.17 | 64 | 95 |
| 3 | 20.3 | 751.1 | 1.3 | 6 | 11.90 | 440.30 | 59 | 99 |
| Average ± SD | 23 ± 2 | 857 ± 81 | | | 14 ± 2 | 524 ± 68 | 61 ± 2 | 97 ± 2 |

5.3 Thin Layer Chromatography Methods

Silica gel 60 $F_{254}$ coated aluminum-backed TLC sheets were cut to 10 cm in length. Samples were spotted at 1-cm baseline and plates were run using 80% acetonitrile in water as the mobile phase. TLC plates were scanned using an Eckert & Ziegler AR-2000 radio-TLC imaging scanner. Cold FDG and FDS were visualized by spaying the TLC plates with potassium permanganate solution.

Example 6

Kit-Based Synthesis of 2-deoxy-[$^{18}$F]-fluoro-$_D$-sorbitol for Bacterial Imaging This example provides one embodiment of a protocol for the rapid, room-temperature, kit-based synthesis of $^{18}$F-FDS for positron emission tomography imaging in bacterial infections.

6.1 Overview

Clinically available imaging tools for diagnosing infections rely on structural changes in the affected tissues. They therefore lack specificity and cannot differentiate between oncologic, inflammatory, and infectious processes. 2-deoxy-2-[$^{18}$F]fluoro-$_D$-sorbitol ($^{18}$F-FDS) as an imaging agent to visualize infections caused by Enterobacterales, which represent the largest group of bacterial pathogens in humans and are responsible for severe infections, often resulting in sepsis or death.

A clinical study in 26 prospectively enrolled patients demonstrated that $^{18}$F-FDS positron emission tomography (PET) was safe, could detect and localize infections due to drug-susceptible or multi-drug resistant Enterobacterales strains, as well as differentiate them from other pathologies (sterile inflammation or cancer). $^{18}$F-FDS is cleared almost exclusively through renal filtration and also has shown potential as a PET agent for functional renal imaging.

Since most PET radionuclides have a short half-life, maximal clinical impact will require fast, on-demand synsize, starting radioactivity, volumes, and flow rates on the radiochemical yield and purity were evaluated. The optimized protocol can be completed in less than 30 min and allows the synthesis of $^{18}$F-FDS in greater than 70% radiochemical yield and greater than 90% radiochemical purity.

6.2 Background

Positron emission tomography (PET) is a noninvasive imaging technology that utilizes radiotracers to visualize molecular biology in situ. PET relies on localizing scintillation events due to positron decay of radioisotopes bound to a target molecule of interest. PET is now available as a routine clinical tool, particularly for oncology, neurology, and cardiology, James and Gambhir, 2012, in developed and developing countries. Jain, 2017. PET imaging typically takes 15-60 minutes and is usually performed 1-2 hours after an intravenous administration of the radiotracer. Recent developments, such as total-body PET, have shortened the scan duration and increased sensitivity. Cherry et al., 2017.

The incorporation of positron emitting radionuclides into appropriate tracer molecules takes place in radiochemistry facilities with appropriate radiation protection amenities and by qualified personnel. Therefore, clinical adoption of new PET tracers depends on the development of fast, simple, and reproducible radiolabeling strategies. Automated radiosyntheses are preferred as they reduce user-bias and radiation exposure to the radiochemist. Such radiosyntheses, however, are often limited to facilities with access to an in-house cyclotron. The International Atomic Energy Agency estimates a total of approximately 6,000 PET scanners and approximately 1,000 cyclotrons exist worldwide. IAEA. IMAGINE, Vol. 2021.

Nuclear imaging centers with PET scanners, but without cyclotrons, rely on radiotracers being synthesized off-site. Due to radioactive decay, the transportation of PET tracers from the production site to the clinical PET scanner must be achieved within hours, being often limited to fluorine-18 labeled radiotracers ($^{18}$F, $t_{1/2}$=110 min). Conversely, radiometals (e.g., $^{99m}$Tc, $^{111}$In, $^{67/68}$Ga) used in PET and single-photon emission computed tomography (SPECT) imaging are commonly incorporated into molecules by simple one-step kit-based mechanisms on site, without the need for specialized radiosynthesis and purification facilities.

Recently, advancements in late-stage fluorination mechanisms and solid-supported syntheses have enabled the application of one-step kit-based synthesis to $^{18}$F-labeled PET tracers, which once developed require minimal technical skills. Wängler et al., 2010; Basuli et al., 2016; van der Born et al., 2017; Allott et al., 2019; Liu et al., 2015; Wängler et al., 2012.

6.2.1 2-deoxy-2-[$^{18}$F]fluoro-$_D$-sorbitol ($^{18}$F-FDS), a Clinical PET Tracer for Bacterial Imaging Enterobacterales, such as *Escherichia coli, Klebsiella pneumoniae, Enterobacter* spp., *Salmonella* spp., *Serratia* spp., *Yersinia* spp., and the like, are Gram-negative bacteria representing the largest group of bacterial pathogens in humans. Donnenberg, 2010. They produce a range of severe infections that can result in sepsis or death. Multi-drug resistant (MDR) strains have become widespread globally and thus designated as urgent threats to human health. CDC 2019. Importantly, antimicrobial drug resistance is amongst the top ten threats to human health and it is estimated that drug-resistant infections will become the leading cause of death globally, surpassing those due to cancer by 2050. O'Neill, 2016. A cumulative 100 trillion USD of economic output is at risk due to the rise of drug-resistant infections.

Diagnosis of bacterial infections requires the isolation of the pathogen in available clinical samples, such as blood, urine, stool or cerebrospinal fluid. These clinical samples, however, are often nondiagnostic or insensitive for the detection of deep-seated bacterial infections. Tucker et al., 2018. Surgical resection or biopsy of infected tissues is often considered the last resort for establishing a definitive diagnosis in such situations, but sampling bias and accessibility hinder and limit these approaches. Finally, clinically available imaging tools such as radiography, ultrasonography, computed tomography (CT), and magnetic resonance imaging (MRI) rely on structural changes in anatomy or tissue morphology that are often delayed relative to the disease process, are non-specific, and reflect a combination of the infection and the host inflammatory response. Therefore, there is an unmet clinical need for rapid, whole-body and specific imaging methods to detect bacteria in situ. Noninvasive molecular imaging technologies such as PET can overcome these limitations by employing radiolabeled molecules that selectively accumulate in bacteria to visualize and localize infections in the body with high specificity. Mota et al., 2020; Ordonez et al., 2021.

Pathogen-specific imaging relies on metabolic, structural, or mechanistic differences between mammalian and bacterial cells. Radiotracers under development for bacterial imaging include small molecules targeting carbohydrate metabolism, Gowrishankar et al., 2017; Weinstein et al., 2014, bacterial folate biosynthesis, Mutch et al., 2018; Ordonez et al., 2017; Sellmyer et al., 2017, Zhang et al., 2018, iron transport, Petrik et al., 2018, $_D$-amino acids, Parker et al., 2020, antimicrobial peptides, Vilche et al., 2016, which have been discussed in recent reviews. Mota et al., 2020; Polvoy et al., 2020. Targeting metabolic pathways offers the advantage of intracellular enzymatic turnover and trapping, leading to accumulation and signal amplification over background signal from unaffected mammalian tissues. 2-deoxy-2-[$^{18}$F]fluoro-$_D$-sorbitol ($^{18}$F-FDS) is a sugar alcohol that selectively accumulates in the Enterobacterales class of bacteria via a metabolically conserved sorbitol-specific pathway.

In mouse models, $^{18}$F-FDS PET/CT was able to distinguish infection from sterile inflammation and detect therapeutic failures associated with multidrug resistant (MDR), extended-spectrum β-lactamase producing *E. coli* strains. Weinstein et al., 2014; Li et al., 2018; Yao et al., 2016.

Figure 3:
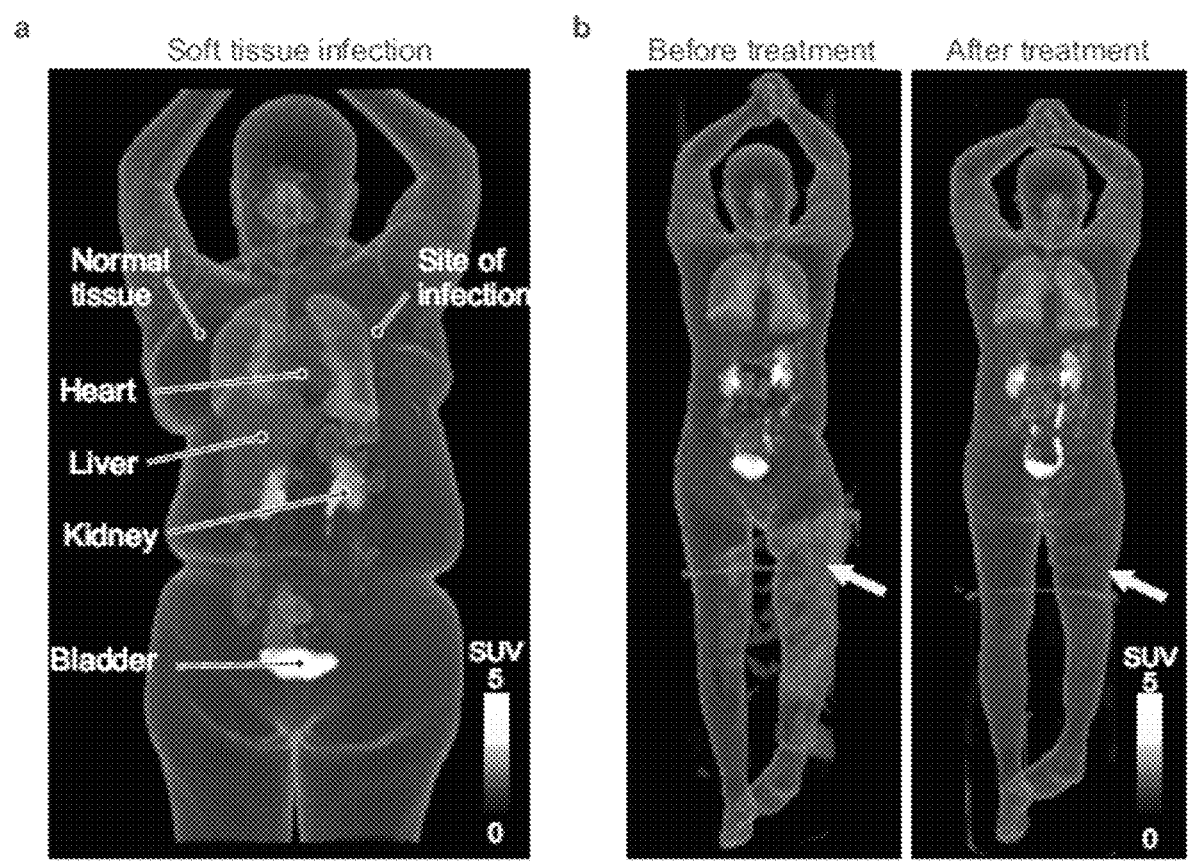

In a hamster model of COVID-19, $^{18}$F-FDS PET/CT selectively differentiated severe acute respiratory syndrome coronavirus 2 (SARS-CoV-2) pneumonia from secondary *Klebsiella pneumoniae* pneumonia, i.e. $^{18}$F-FDS was not taken up in the lungs of hamsters infected only with SARS-CoV-2. Ordonez et al., 2021. In a prospective clinical study, $^{18}$F-FDS PET/CT successfully detected Enterobacterales infections due to drug-susceptible or MDR strains and distinguished them from sterile inflammation or cancerous lesions. Repeat imaging after antibiotic treatments revealed that $^{18}$F-FDS also was able to monitor antimicrobial response (FIG. 3). Ordonez et al., 2021.

It should be noted, however, that although $^{18}$F-FDS PET can specifically detect infections due to Enterobacterales, it cannot detect infections due to all classes of bacteria. Enterobacterales represent the largest group of bacterial pathogens in humans, Donnenberg, 2010, as well as frequently associated with MDR infections, which are designated as urgent threats to human health. CDC, 2019. Additionally, $^{18}$F-FDS requires bacterial enzymatic activity based on adenosine triphosphate (ATP) and so theoretically may not fare well in clinical infections where the predominant bacterial populations are metabolically inactive. Finally, PET is not widely available and when a patient presents with a suspected infection of unknown origin, maximum benefit from diagnostic PET will be achieved only if the patient can be imaged on the same day, before starting empiric antibiotic therapy. Successful implementation of routine PET studies for diagnostic and treatment selection purposes, will therefore greatly benefit from on-demand availability of pathogen-specific PET tracers. Ordonez et al., 2019.

6.2.2 $^{18}$F-FDS, a Clinical PET Tracer for Functional Renal Imaging

Molecular imaging to evaluate renal function is an evolving field. Blaufox et al., 2018. Current approaches are focused on technetium-99m radiopharmaceuticals [e.g., $^{99m}$Tc-mercaptoacetyltriglycine ($^{99m}$Tc-MAG3) and $^{99m}$Tc-diethylenetriaminepentaacetic acid ($^{99m}$Tc-DTPA)] combined with planar gamma cameras. Although these techniques are widely used in the clinic, they are limited by two-dimensional information leading to a lack of accurate anatomic correlation, low spatial resolution, and low signal/background ratios. Soft-tissue attenuation associated with mostly low-energy radionuclides may also limit reliable quantification. Werner et al., 2019. Therefore, there has been increasing interest in developing PET-based functional renal imaging agents, which offer advantages, such as three-dimensional dynamic visualization of the kidneys, higher sensitivity and signal/background ratio, and absolute camera-based quantification. Toyama et al., 2021. Since mammalian cells do not have mechanisms of uptake for $^{18}$F-FDS and it is predominantly cleared through the kidneys, Ordonez et al., 2021; Weinstein et al., 2014; Zhu et al., 2016.

$^{18}$F-FDS PET also has been used as an investigational tracer for functional renal imaging. Werner et al., 2018; Werner et al., 2019. Dynamic $^{18}$F-FDS PET demonstrated rapid accumulation of $^{18}$F-FDS in the renal cortex in healthy control rats. Renal uptake of $^{18}$F-FDS, however, was significantly delayed in rats with acute renal failure or unilateral ureteral obstruction kidneys. Werner et al., 2018. Urine concentrations of $^{18}$F-FDS and 99mTc-DTPA correlated well with each other. Additionally, dynamic $^{18}$F-FDS PET performed in two healthy volunteers demonstrated rapid $^{18}$F-FDS accumulation in the renal cortex with gradual transition to the parenchyma. Given the higher spatiotemporal resolution of PET relative to conventional scintigraphy, $^{18}$F-FDS PET offers a more thorough evaluation of human renal kinetics. Werner et al., 2019.

6.2.3 Radiosynthesis Approaches for $^{18}$F-FDS

One of the main advantages of $^{18}$F-FDS is that it can be synthesized from 2-deoxy-2-[$^{18}$F]fluoro-$_D$-glucose ($^{18}$F-FDG), the most widely used and commercially available PET tracer worldwide. The first reported synthesis of $^{18}$F-FDS consisted of a reduction of $^{18}$F-FDG with sodium borohydride in solution (in a temperature-controlled system), followed by quenching, pH adjustment, and filtering. Li et al., 2008. Since the conversion is nearly quantitative, no further purification is required. Alternative synthetic approaches have been developed, including an automated synthesis of $^{18}$F-FDS from cyclotron-generated aqueous $^{18}$F-fluoride and a solid-phase synthesis using sodium borohydride on aluminum oxide (Table 3.). Yao et al., 2016; Hasegawa et al., 2021. A limitation of the automated radiosynthetic approach is that, in clinical practice, on-demand availability would not be possible as it would require constant availability of highly specialized equipment and qualified personal. Conversely, commercially available $^{18}$F-FDG can be obtained daily in most PET imaging facilities, which can facilitate a simple, rapid, one-step kit for on-demand synthesis of $^{18}$F-FDS from $^{18}$F-FDG as provided herein below.

6.3 Experimental Design

In some embodiments, the presently disclosed subject matter provides a self-contained kit that can be used to synthesize, purify, and formulate $^{18}$F-FDS in under 30 minutes (FIG. 4). Note that a pre-formulated kit would not require cartridge assembly and would therefore allow this process to be completed within 10 minutes. The kit uses clinical doses of $^{18}$F-FDG (max. 925 MBq) as the starting material and yields clinical doses of $^{18}$F-FDS (min. 370 MBq), which will facilitate its clinical translation. The chemical process is optimized for room temperature synthesis and, due to its simplicity, does not require any other specialized equipment. The kit consists of a small cartridge filled with a solid-supported borohydride source.

Macroporous triethylammonium methylpolystyrene borohydride (MP-Borohydride) was selected as the reagent for the initial prototype. In brief, MP-borohydride is a positively charged microporous material with bound negatively charged borohydride. To determine if MP-borohydride could reduce $^{18}$F-FDG to $^{18}$F-FDS this was first attempted using a molar equivalent of sodium borohydride using the standard reduction conditions. In solution, complete reduction of $^{18}$F-FDG was achieved in 30 min, both at 35° C. and room temperature.

The following experimental studies included investigating the appropriate amount of reagent that will produce high radiochemical yield (RCY) and purity, finding the optimal volume of the starting $^{18}$F-FDG solution, and time of elution. The cartridge protocol was then optimized for use with clinical doses of $^{18}$F-FDS and a second cartridge was added to obtain a sample pH suitable for in vivo intravenous administration. Table 4 summarizes the reaction conditions tested to optimize the protocol.

6.3.1 Cartridge Size and Reagent Amount

Polymer-supported borohydrides can be used in molar excess to drive the reaction to completion more easily and decrease the reaction time. Using a closed cartridge system there is no need for additional filtration and workups. Solid-phase cartridges were prepared with varying amounts of MP-borohydride (Table 4). Cartridges containing 300 mg of MP-borohydride were able to produce $^{18}$F-FDS with a greater than 90% radiochemical purity (n=8) when starting with less than 370 MBq of $^{18}$F-FDG. The radiochemical purity was reduced, however, when using higher doses. A larger cartridge containing 500 mg of reagent was found suitable to produce $^{18}$F-FDS in greater than 70% yield and greater than 90% radiochemical purity when starting with up to 925 MBq (n=6). $^{18}$F-FDS injections in humans are performed with a minimum dose of 370 MBq. Thus, the kit synthesis was optimized to start with 925 MBq of $^{18}$F-FDG, which is the maximum single dose commercially available.

6.3.2 Volume and Elution Rates

While testing different reaction conditions, it was observed that preconditioning the borohydride cartridge was imperative to the synthesis. Additionally, the flow rate and volume of the $^{18}$F-FDG solution passing through the cartridge also was an important factor to consider. When the $^{18}$F-FDG solution was under 1 mL and the flow rate was 1 mL/min, the RCY and radiochemical purity were lower compared to a volume higher than 2 mL and flow rate of 0.25 mL/min (Table 4).

Diluting the starting $^{18}$F-FDG solution may be required and decreasing the flow rate allows the solution to interact longer with the borohydride, thus increasing the reducing capability of the reagent.

6.3.3 Alterative Reagents

This protocol was tested using additional sources of solid-supported borohydride. For example, cartridges containing NaBH$_4$ on aluminum oxide produced $^{18}$F-FDS with less than 10% radiochemical purity under different reaction conditions (n=4).

(Polystyrylmethyl)trimethylammonium borohydride and borohydride on Amberlite® IRA-400 both produced $^{18}$F-FDS with less than 80% radiochemical purity (n=3 and n=4, respectively). MP-borohydride was superior in consistently producing high RCY and radiochemical purity greater than 90%.

6.3.4 Formulation for In Vivo Administration

The chemical reduction of $^{18}$F-FDG into $^{18}$F-FDS results in an increase in pH, which when using high doses led to pH 10. To minimize handling, as well as ensure a closed kit system, whether a second cartridge could be used to ensure acceptable pH for intravenous administration into animals and humans (pH 6-8) was investigated. Sep-Pak alumina did not affect the pH of the sample. A cartridge was found to reduce pH to 6, consistently. When starting with 857±80 MBq of $^{18}$F-FDG, 523±68 MBq of $^{18}$F-FDS were eluted, resulting in greater than 60% radiochemical yield, with greater than 90% radiochemical purity (n=3). The use of this cartridge significantly increases the volume of the product, however, which may limit its application for preclinical studies. It was found that a solid-phase extraction (SPE) cartridge packed with polystyrene-divinylbenzene copolymer with a strong cation exchanger (Chromafix-PS—H+) can be attached in line to the MP-borohydride cartridge and reduce pH from 12 to 6, without increasing volume.

6.3.5 Quality Control (QC)

The QC employed for the preclinical studies with kit-generated $^{18}$F-FDS consisted of visual inspection of appearance, pH measurement, and confirmation of chemical identity and purity using thin-layer chromatography (TLC) methods. Radio-TLC can be used to measure the retention factor ($R_f$) of $^{18}$F-FDS in silica plates, which can then be matched to the $R_f$ of the non-radioactive standard material (FDS) visible by staining with permanganate solution, as previously reported. Li et al., 2008; Yao et al., 2016. $^{18}$F-FDS shows a distinct $R_f$ from $^{18}$F-FDG and $^{18}$F-fluoride ion, so the same method can be used to measure radiochemical purity.

6.3.6 Clinical Translation

The kit was designed to facilitate synthesis of $^{18}$F-FDS in PET centers where sophisticated radiochemistry facilities may not be available. As commercially available $^{18}$F-FDG synthesized under current good manufacture practices (cGMP) is the starting material, the number of tests required for QC is significantly reduced. For example, this method does not require the use of organic solvents or additional reagents, such as phase-transfer catalysts, normally required for the syntheses of $^{18}$F tracers. Residual solvent and reagent analysis is therefore not required. The SPE cartridge, however, is versatile and can be incorporated as the final step in the synthesis of $^{18}$F-FDS from in-house cyclotron-generated $^{18}$F with $^{18}$F-FDG as the intermediate. Additionally, SPE cartridges can be added to synthesis cassettes used in automated synthesis systems. While the kit method is robust and can easily be adopted by multiple centers, clinical use and method variations may require additional toxicity tests, release criteria and QC tests based on local regulations.

6.4 Materials

6.4.1 Reagents

! CAUTION When handling radioactive materials ($^{18}$F-fluoride) it is important to minimize time of exposure, ensure appropriate distance and lead shielding. Personal radiation dosimeters should be worn, and radiation exposure monitored by appropriate radiation safety authorities.

Representative reagents include: 2-Deoxy-2-fluoro-$_D$-glucose (FDG, Sigma-Aldrich, cat. no. F5006); Sodium borohydride (NaBH$_4$, Sigma-Aldrich, cat. no. 71320); Acetic acid (Sigma-Aldrich, cat. no. A6283); Sodium bicarbonate (NaHCO$_3$, Sigma-Aldrich, cat. no. S8875); Potassium permanganate (KMnO$_4$, Sigma-Aldrich, cat. no. 223468); Potassium carbonate, anhydrous (K$_2$CO$_3$, Sigma-Aldrich, cat. no. 791776); Sodium hydroxide solution (Sigma-Aldrich, cat. no. 415413); 2-Deoxy-2-[$^{18}$F]-fluoro-$_D$-glucose ($^{18}$F-FDG, Sofie Co (USA), or alternative source); Macroporous triethylammonium methylpolystyrene borohydride (MP-Borohydride; Biotage, cat. no. 801469); Sodium borohydride on aluminum oxide (Sigma-Aldrich, cat. no. 243620); Polystyrylmethyl)trimethylammonium borohydride (Sigma-Aldrich, cat. no. 359947); Borohydride on Amberlite® IRA-400 (Sigma-Aldrich, cat. no. 328642); Phosphate-buffered saline (PBS, 0.01 M potassium phosphate monobasic, 0.155 M sodium chloride, 0.003 M sodium phosphate dibasic, pH 7.4; Thermofisher, cat. no. 10010049); Deionized water (obtained from Milli-Q integral water purification system); Silica Gel 60 F$_{254}$ Coated Aluminum-Backed TLC Sheets (Fisher scientific, cat. no. M1055340001); pH test strips (pH 0-14, resolution 1.0 pH unit, Sigma-Aldrich, cat. no. P4786-100EA).

6.4.2 Reagent Setup

6.4.2.1 2-deoxy-2-fluoro-$_D$-sorbitol

! CAUTION Store in a cool dry area.

Transfer 12 mg of 2-deoxy-2-fluoro-$_D$-glucose to a vial and dissolve in 1 mL of water. Add 10 mg of NaBH$_4$ and react for 15 min at 55° C. Upon cooling, quench with 25% acetic acid (25 µL) and adjust to pH 7 with NaHCO$_3$. Filter through an Alumina-N Sep-Pak cartridge and lyophilize the filtrate. $^1$H NMR (500 MHz, D$_2$O) δ 4.64-4.36 (m, 1H), 3.95-3.82 (m, 1H), 3.82-3.60 (m, 4H), 3.60-3.44 (m, 2H).

6.4.2.2 Potassium Permanganate Solution

! CAUTION Should be used within one month of preparation.

Dissolve 1.5 g of KMnO$_4$ and 10 g of K$_2$CO$_3$ in 200 mL of water. Add 1.25 mL of a 10% NaOH solution.

6.4.3 Equipment

Reversible SPE tubes, (2 mL, non-fluorous polypropylene, with frit (20 m porosity), and female Luer fitting top; Sigma-Aldrich, cat. no. 57608-U). Reversible SPE tubes (1 mL, non-fluorous polypropylene, with frit (20 m porosity), and female Luer fitting top; Sigma-Aldrich, cat. no. 57607-U). CHROMAFIX PS—H+ small SPE cartridge (0.4 mL, polyethylene filter; Macherey-Nagel cat. no. 731867); CHROMABOND© SET V (ABX advanced biochemical compounds, cat. no. 00260165); Vials, screw top (Sigma-Aldrich, cat. No. Z115150-12A); Single use plastic syringe (5 mL, slip-tip, BD, cat. no. 309647); Needles (21 gauge× 1.5 inches; BD, cat. no. 305167); Pro-Tec™ PET Syringe Shields with lead glass window, 10 cc (Biodex, cat. no. 007-980); Radio-TLC imaging scanner (Eckert+Ziegler AR-2000, or equivalent); Dose Calibrator (Capintec CRC—55tR, or equivalent)

6.4.4 Equipment Setup

6.4.4.1 Cartridge Preparation

1. Insert a 20-µm frit at the bottom of a 2-mL SPE cartridge.
2. Weigh out 500 mg of MP-Borohydride and transfer to the 2-mL SPE cartridge. Note that other sources of borohydride have shown inferior reducing capacity (see, for example, Table 4, conditions #16-#24).
3. Add a second 20-µm frit on top of the MP-Borohydride, but do not pack the frit tightly.

Note that the borohydride resin expands upon pre-conditioning therefore space between the frit and borohydride is needed (approximately 2 mm).

4. Seal the top of the cartridge with a female Luer top.

Procedure ! CAUTION Only trained personnel should handle radioactive materials. All waste materials should be handled as radioactive waste following local radiation protection guidelines.

Cartridge Pre-Equilibration (Timing 3 Min)

1. Pass 2 mL of water through the MP-borohydride cartridge.

Preferably, use a moderate flow of 2 mL/min, eluting slowly and monitoring the flow with a timer. Keep the cartridge vertical and do not dry.

2. Prepare the cartridge that will be used to correct the pH after synthesis. There are two options: the PS—H+ and the CHROMABOND© SET V.

PS—H$^+$ Cartridge (for Lower Product Volumes; Recommended for Small Animal Preclinical Work)

Pass 1 mL of water through the PS—H+ cartridge.

CHROMABOND© SET V cartridge (for removal of other potential impurities; recommended if synthesizing $^{18}$F-FDG in house or for clinical use)

Pass 10 mL of water through the CHROMABOND© SET V cartridge.

$^{18}$F-FDG Preparation (Timing 2 Min)

3. If needed, dilute $^{18}$F-FDG solution (maximum 925 MBq [25 mCi] of activity) with water, to ensure volume is between 2 and 3 mL. Retain approximately 10 µL for TLC analysis (Optional). Note that volumes lower than 2 mL may result in lower radiochemical yield and larger volumes have not been tested.

4. Take up the solution in a 5-mL syringe.

5. Measure the starting activity and time in a dose calibrator.

6. Place the 5-mL syringe containing diluted $^{18}$F-FDG solution in a lead syringe shield.

$^{18}$F-FDG reduction to $^{18}$F-FDS (Timing 5-10 Min)

7. Place receiving vial inside a lead container (pot).

8. Attach $^{18}$F-FDG syringe on top of the MP-borohydride cartridge. Place above the receiving vial and clamp.

9. Elute $^{18}$F-FDG solution through the MP-borohydride cartridge dropwise, by pushing the plunger in the syringe. Note that slow elution yields higher purity, elution rate of approximately 0.3 mL/min is recommended.

10. Remove $^{18}$F-FDG syringe and replace with a 5-mL syringe containing 2 mL of PBS.

11. Elute PBS dropwise over 2 min.

12. Measure pH using pH strips. This value is usually pH 8-10.

13. Measure the activity of $^{18}$F-FDS eluted and time.

$^{18}$F-FDS purification and Formulation (Timing 5 Min)

14. For in vivo work, a second cartridge can be used to reduce pH and remove any potential impurities. As mentioned in Step 2, there are two options: the PS—H+ cartridge (option A) and the CHROMABOND© SET V (option B)

A PS—H+ Cartridge i. Cartridge can be connected in line with the borohydride cartridge ii. Follow steps described in $^{18}$F-FDG reduction to $^{18}$F-FDS

B CHROMABOND© SET V i. Cartridge can be connected in line with the borohydride cartridge ii. Follow steps 1 through 3 described in $^{18}$F-FDG reduction to $^{18}$F-FDS iii. Remove $^{18}$F-FDG syringe and replace with a 20 mL syringe containing 20 mL of PBS.

iv. Elute PBS.

v. Discard first 10 mL and keep the remaining 10 mL in the receiving vial.

vi. Measure pH using pH strips.

vii. Measure the activity of $^{18}$F-FDS eluted and time.

Quality Control of $^{18}$F-FDS (Timing 10-20 Min)

Visual Appearance

! CAUTION Use appropriate radiation shielding (e.g. leaded glass).

15. Visually inspect the $^{18}$F-FDS solution and confirm the resulting solution is clear and shows no evidence of foreign matter. pH test 16. Apply drops of $^{18}$F-FDS solution to pH indicator paper. Match strip colors to indicator chart. pH is usually 6.

Radiochemical Yield

17. Transfer the $^{18}$F-FDS collection vial to a dose calibrator.

18. Record radioactivity and time of reading.

19. Calculate RCY using the following equation: RCY (%)=($^{18}$F-FDG starting activity)/($^{18}$F-FDS collected activity)*100

Radiochemical Purity and Identity

20. Prepare 10×1.5 cm TLC strips with marked 1 cm baseline from the bottom and 1 cm solvent front from the top.

21. Dilute $^{18}$F-FDG and $^{18}$F-FDS aliquots in Eppendorf tubes with 1 mL water. Measure the activity of the aliquots and dilute further if needed to ensure activity is approximately 0.5 MBq/µL.

22. Using the diluted aliquots from the Eppendorf tubes, spot samples (2 µL) of starting $^{18}$F-FDG, eluted $^{18}$F-FDS, and a mixture of $^{18}$F-FDG+$^{18}$F-FDS onto 1-cm baseline of TLC plates.

23. Develop the TLC plates in a chamber with 80% acetonitrile in water as the mobile phase.

24. Once finished and the plates are dry, scan plates with Eckert+Ziegler AR-2000 radio-TLC imaging scanner (or alternative radio-TLC scanner).

25. To confirm chemical identity, $R_f$ from radio-chromatogram must match $R_f$ of the standard FDS (prepared as described in Reagent Setup).

26. Calculate the radiochemical purity using the following equation: Radiochemical purity=peak area ($^{18}$F-FDS peak)/Sum (all peak areas)*100. A radiochemical purity greater than 90% is required.

TLC Analysis of FDG and FDS

27. Prepare 10×1.5 cm TLC strips with marked 1 cm baseline from the bottom and 1 cm solvent front from the top.

28. Dilute FDG and FDS aliquots in Eppendorf tubes with 1 mL water.

29. Spot samples (2 µL) onto 1-cm baseline of TLC plates.

30. Develop the TLC plates in a chamber with 80% acetonitrile in water as the mobile phase.

31. Once finished and the plates are dry, spray with potassium permanganate solution and dry with heating. Spots appear yellow on a purple background.

32. Calculate retention factor ($R_f$).

6.5 Troubleshooting

Troubleshooting procedures are provided in Table 5. The times required for representative troubleshooting steps are presented immediately herein below.

Steps 1-2, Cartridge pre-equilibration: 3 min

Steps 3-6, $^{18}$F-FDG preparation: 2 min

Steps 7-13, $^{18}$F-FDG reduction to $^{18}$F-FDS: 5 to 10 min
Step 14, $^{18}$F-FDS purification and formulation: 5 min
Steps 15-32, Quality Control of $^{18}$F-FDS: 10-20 min

Figure 5:
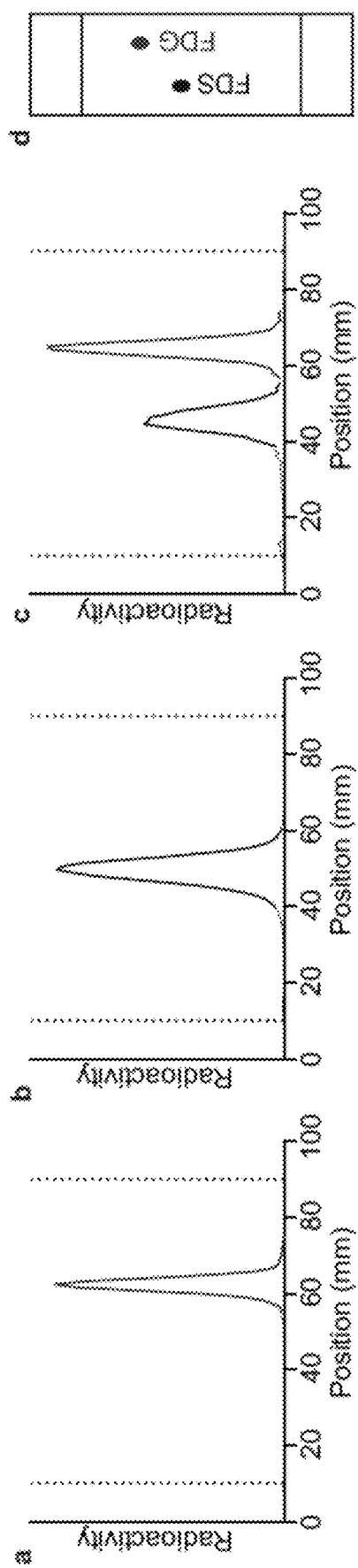
Figure 6:
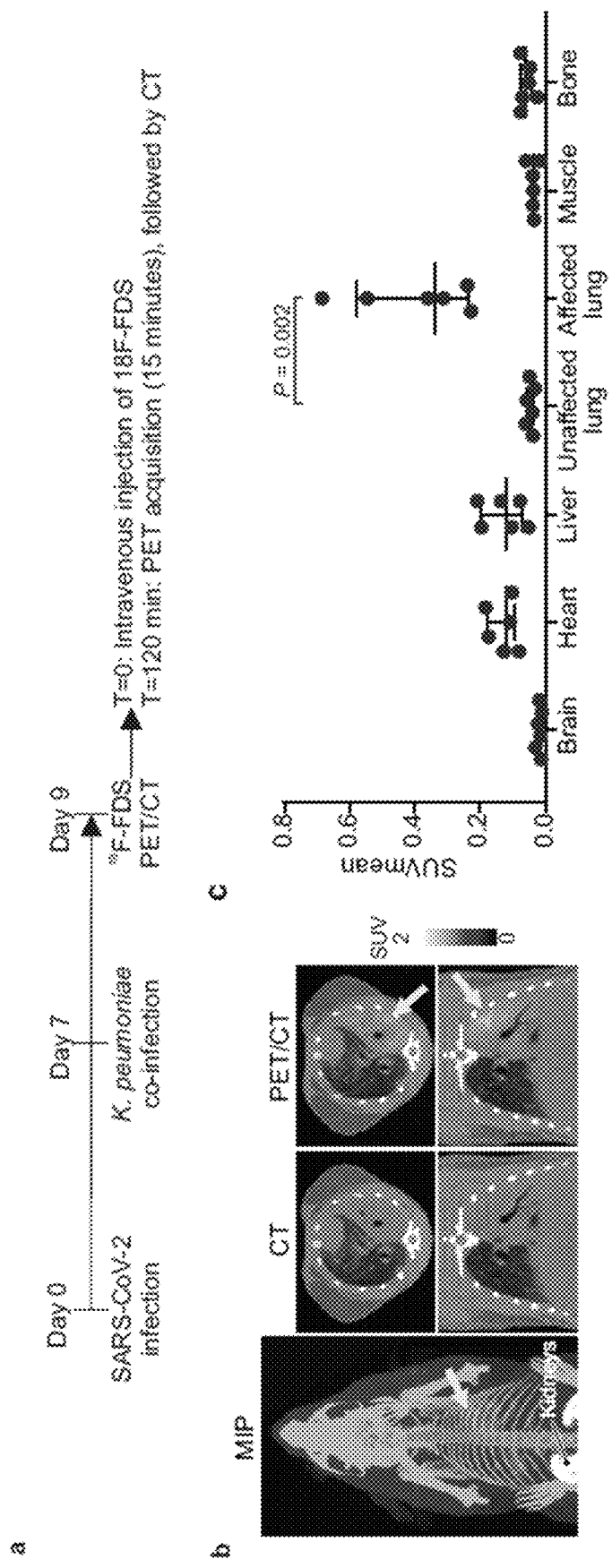

6.6 Anticipated Results $^{18}$F-FDS is obtained in greater than 70% radiochemical yield as a clear, colorless solution with no visible particulate matter. The solution pH is 6 (between 6-8 is acceptable). Radio-TLC shows a spot for $^{18}$F-FDS at approx. 50 mm (retention factor of 0.6), and unreacted $^{18}$F-FDG at 65 mm (retention factor 0.7), which matches the TLC $R_f$s obtained with standard FDG and FDS (within 10%) (FIG. 5). Radio-chemical purity ≥90% is acceptable. Following these criteria, $^{18}$F-FDS can then be used for in vitro or in vivo follow-up experiments (FIG. 6).

Following intravenous administration into mammals, $^{18}$F-FDS is predominantly cleared through the kidneys and allows for evaluation of renal function. PET/CT imaging performed 2 hours post-injection shows minimal uptake in the heart, liver, and gastrointestinal tract. $^{18}$F-FDS accumulates in regions of infection by Enterobacterales. Repeat imaging following treatment can evaluate treatment success, which is characterized by absence or significantly decreased $^{18}$F-FDS signal. Treatment failure can be detected if $^{18}$F-FDS signal remains following treatment.

TABLE 3

Methods for radio-synthesis of $^{18}$F-FDS.

| Reference | Starting Material | Reducing agent | Temperature control | 'Hot cell' need | On-demand | Minimal liquid handling | In vivo validation |
|---|---|---|---|---|---|---|---|
| Li et al., 2008 | $^{18}$F-FDG | NaBH$_4$ | Needed | No | Yes | No | Yes |
| Hasegawa et al., 2016 | $^{18}$F-FDG | NaBH$_4$—Al$_2$O$_3$ | Not needed | No | Yes | No | No |
| Yao et al., 2016 | $^{18}$F- | NaBH$_4$ | Needed | Yes | No | Yes | Yes |
| Present disclosure (Ordonez et al., 2021) | $^{18}$F-FDG | MP-Borohydride | Not needed | No | Yes | Yes | Yes |

TABLE 4

Representative reaction conditions.

| Condition # | Reducing agent | Amount of reducing agent (mg) | Cartridge pre-equilibration or sample modifications | Activity$^a$ (MBq) | Volume (mL) | Non-decay-corrected yield$^b$ (%) | Radiochemical purity$^c$ (%) |
|---|---|---|---|---|---|---|---|
| 1 | MP-borohydride | 32 | — | 277 | 1 | 87 | <50 |
| 2 | MP-borohydride | 100 | — | 284 | 1 | 79 | 71 |
| 3 | MP-borohydride | 200 | — | 176 | 1 | 70 | 98 |
| 4 | MP-borohydride | 200 | — | 291 | 1 | 70 | 92 |
| 5 (n = 3) | MP-borohydride | 300 | Pre-equilibrated with water (2 mL) | 123 ± 37 | 1 | 75 ± 8 | >99 |
| 6 | MP-borohydride | 300 | Pre-equilibrated with 1% acetic acid, pH 3 (2 mL) | 97 | 1 | 77 | 95 |
| 7 (n = 2) | MP-borohydride | 300 | — | 303 ± 6 | 1 | 76 ± 7 | 98 ± 2 |
| 8 | MP-borohydride | 300 | Added 2 mg Glucose to $^{18}$F-FDG | 296 | 1 | 86 | 99 |
| 9 | MP-borohydride | 300 | Added 4 mg Glucose to $^{18}$F-FDG | 304 | 1 | 87 | 99 |
| 10 (n = 3) | MP-borohydride | 300 | — | 391 ± 14 | 1-3 | 74 ± 6 | 46 ± 9 |
| 13 | MP-borohydride | 500 | Pre-equilibrated with water (2 mL) | 294 | 1.4 | 90 | >99 |
| 14 (n = 4) | MP-borohydride | 500 | Pre-equilibrated with water (2 mL) | 365 ± 48 | 1-2 | 63 ± 4 | >99 |

TABLE 4-continued

Representative reaction conditions.

| Condition # | Reducing agent | Amount of reducing agent (mg) | Cartridge pre-equilibration or sample modifications | Activity[a] (MBq) | Volume (mL) | Non-decay-corrected yield[b] (%) | Radiochemical purity[c] (%) |
|---|---|---|---|---|---|---|---|
| 15 (n = 5) | MP-borohydride | 500 | Pre-equilibrated with water (2 mL) | 898 ± 66 | 1.3-2.6 | 71 ± 13 | 97 ± 2 |
| 16 | NaBH₄ on aluminum oxide | 300 | Pre-equilibrated with water (2 mL) | 342 | 1.1 | 92 | 7 |
| 17 (n = 2) | NaBH₄ on aluminum oxide | 500 | Pre-equilibrated with water (2 mL) | 405 | 1.3 | 82 | 6 |
| 18 | (Polystyrylmethyl) trimethyl-ammonium borohydride | 300 | Pre-equilibrated with water (2 mL) | 356 | 1.1 | 67 | 35 |
| 19 | (Polystyrylmethyl) trimethyl-ammonium borohydride | 500 | Pre-equilibrated with water (2 mL) | 897 | 1 | 47 | 51 |
| 20 | (Polystyrylmethyl) trimethyl-ammonium borohydride | 500 | Pre-equilibrated with water (2 mL) | 524 | 2.5 | 76 | 83 |
| 21 | Borohydride on Amberlite® IRA-400 | 300 | Pre-equilibrated with water (2 mL) | 440 | 1 | 81 | 42 |
| 22 | Borohydride on Amberlite® IRA-400 | 300 | Pre-equilibrated with water (2 mL) | 637 | 1.2 | 82 | 71 |
| 23 | Borohydride on Amberlite® IRA-400 | 500 | Pre-equilibrated with water (2 mL) | 537 | 2.5 | 55 | 71 |
| 24 | Borohydride on Amberlite® IRA-400 | 500 | Pre-equilibrated with water (2 mL) | 940 | 2.3 | 71 | 81 |

[a]Decay-corrected to time of delivery;
[b]Calculated as activity eluted/starting activity*100;
[c]Measured by radio-TLC.

TABLE 5

Representative troubleshooting protocols

| Problem | Possible Reason | Solution |
|---|---|---|
| Low efficiency of radioactivity elution - Low radiochemical yield (Detected in step 19) | $^{18}$F-FDG volume is too low (Step 3) | Dilute $^{18}$F-FDG solution with water. Use larger volume of saline to flush the cartridge. |
| Low radiochemical purity (Detected in step 26) | MP-borohydride has degraded | MP-Borohydride should be stored in a cool, dry area at 5° C. The borohydride content of the resin can be determined by measuring hydrogen evolution.[39] If this is not possible, do not use a bottle of MP-borohydride that has been open for longer than three months. |
| Rate of elution is too fast (Step 9) | | Elute $^{18}$F-FDG more slowly. |

REFERENCES

All publications, patent applications, patents, and other references mentioned in the specification are indicative of the level of those skilled in the art to which the presently disclosed subject matter pertains. All publications, patent applications, patents, and other references are herein incorporated by reference to the same extent as if each individual publication, patent application, patent, and other reference was specifically and individually indicated to be incorporated by reference. It will be understood that, although a number of patent applications, patents, and other references are referred to herein, such reference does not constitute an admission that any of these documents forms part of the common general knowledge in the art.

International Patent Application Publication No. WO2014043606 for Bacteria-Specific Labeled Substrates as Imaging Biomarkers to Diagnose, Locate, and Monitor Infections, to Jain et al., published Mar. 20, 2014.

James, M. L. and Gambhir, S. S. A molecular imaging primer: modalities, imaging agents, and applications. *Physiol Rev* 92, 897-965 (2012).

Jain, S. K. The Promise of Molecular Imaging in the Study and Treatment of Infectious Diseases. *Mol Imaging Biol* 19, 341-347 (2017).

Cherry, S. R., et al. Total-body imaging: Transforming the role of positron emission tomography. *Science Translational Medicine* 9, eaaf6169 (2017).

IAEA. IMAGINE—general data overview. Vol. 2021.

Wängler, C., et al. One-step $^{18}$F-labeling of carbohydrate-conjugated octreotate-derivatives containing a silicon-fluoride-acceptor (SiFA): in vitro and in vivo evaluation as tumor imaging agents for positron emission tomography (PET). *Bioconjug Chem* 21, 2289-2296 (2010).

Basuli, F., Zhang, X., Jagoda, E. M., Choyke, P. L. and Swenson, R. E. Facile room temperature synthesis of fluorine-18 labeled fluoronicotinic acid-2,3,5,6-tetrafluorophenyl ester without azeotropic drying of fluorine-18. *Nuclear Medicine and Biology* 43, 770-772 (2016).

van der Born, D., et al. Fluorine-18 labelled building blocks for PET tracer synthesis. *Chem Soc Rev* 46, 4709-4773 (2017).

Allott, L., Barnes, C., Brickute, D., Leung, S. F. J. and Aboagye, E. O. Solid-supported cyanoborohydride cartridges for automation of reductive amination radiochemistry. *Reaction Chemistry and Engineering* 4, 1748-1751 (2019).

Liu, Z., et al. One-step $^{18}$F labeling of biomolecules using organotrifluoroborates. *Nat Protoc* 10, 1423-1432 (2015).

Wängler, C., et al. One-step $^{18}$F-labeling of peptides for positron emission tomography imaging using the SiFA methodology. *Nature Protocols* 7, 1946-1955 (2012).

Donnenberg, M. S. Enterobacteriaceae. in *Mandell, Douglas, and Bennett's principles and practice of infectious diseases.* (ed. Gerald L. Mandell, J. E. B., and Raphael Dolin) 2815-2833 (Elsevier Inc, Philadelphia, PA, 2010).

CDC. Antibiotic Resistance Threats in the United States, 2019. (Centers for Disease Control and Prevention 2019).

O'Neill, J. Tackling Drug-resistant infections globally: Final report and Recommendations. Vol. 2019 (2016).

Tucker, E. W., et al. Noninvasive (11)C-rifampin positron emission tomography reveals drug biodistribution in tuberculous meningitis. *Sci Transl Med* 10(2018).

Mota, F., et al. Radiotracer Development for Bacterial Imaging. *J Med Chem* 63, 1964-1977 (2020).

Ordonez, A. A., et al. Imaging Enterobacterales infections in patients using pathogen-specific positron emission tomography. *Sci Transl Med* 13(2021).

Gowrishankar, G., et al. Specific Imaging of Bacterial Infection Using 6"-($^{18}$F)-Fluoromaltotriose: A Second-Generation PET Tracer Targeting the Maltodextrin Transporter in Bacteria. *J Nucl Med* 58, 1679-1684 (2017).

Weinstein, E. A., et al. Imaging Enterobacteriaceae infection in vivo with $^{18}$F-fluorodeoxysorbitol positron emission tomography. *Sci Transl Med* 6, 259ra146 (2014).

Mutch, C. A., et al. [11C]Para-Aminobenzoic Acid: A Positron Emission Tomography Tracer Targeting Bacteria-Specific Metabolism. *ACS Infectious Diseases* 4, 1067-1072 (2018).

Ordonez, A. A., et al. A Systematic Approach for Developing Bacteria-Specific Imaging Tracers. *Journal of Nuclear Medicine* 58, 144-150 (2017).

Sellmyer, M. A., et al. Bacterial infection imaging with [($^{18}$)F]fluoropropyl-trimethoprim. *Proc Natl Acad Sci USA* 114, 8372-8377 (2017).

Zhang, Z., et al. Positron emission tomography imaging with 2-[$^{18}$F]F-p-aminobenzoic acid detects *Staphylococcus aureus* infections and monitors drug response. *ACS Infectious Diseases* 4, 1635-1644 (2018).

Petrik, M., et al. Imaging of *Pseudomonas aeruginosa* infection with Ga-68 labelled pyoverdine for positron emission tomography. *Sci Rep* 8, 15698 (2018).

Parker, M. F. L., et al. Sensing Living Bacteria in Vivo Using d-Alanine-Derived (11)C Radiotracers. *ACS Cent Sci* 6, 155-165 (2020).

Vilche, M., et al. (6)(8)Ga-NOTA-UBI-29-41 as a PET Tracer for Detection of Bacterial Infection. *J Nucl Med* 57, 622-627 (2016).

Polvoy, I., Flavell, R. R., Rosenberg, O. S., Ohliger, M. A. and Wilson, D. M. Nuclear Imaging of Bacterial Infection: The State of the Art and Future Directions. *Journal of Nuclear Medicine* 61, 1708-1716 (2020).

Li, J., Zheng, H., Fodah, R., Warawa, J. M. and Ng, C. K. Validation of 2-($^{18}$)F-Fluorodeoxysorbitol as a Potential Radiopharmaceutical for Imaging Bacterial Infection in the Lung. *J Nucl Med* 59, 134-139 (2018).

Yao, S., et al. Infection Imaging With ($^{18}$)F-FDS and First-in-Human Evaluation. *Nucl Med Biol* 43, 206-214 (2016).

Ordonez, A. A., et al. Molecular imaging of bacterial infections: Overcoming the barriers to clinical translation. *Sci Transl Med* 11, eaax8251 (2019).

Blaufox, M. D., et al. The SNMMI and EANM practice guideline for renal scintigraphy in adults. *Eur J Nucl Med Mol Imaging* 45, 2218-2228 (2018).

Werner, R. A., et al. The next era of renal radionuclide imaging: novel PET radiotracers. *Eur J Nucl Med Mol Imaging* 46, 1773-1786 (2019).

Toyama Y, et al. Current and Future Perspectives on Functional Molecular Imaging in Nephro-Urology: Theranostics on the Horizon. *Theranostics* (2021).

Zhu, W., et al. Biodistribution and Radiation Dosimetry of the Enterobacteriaceae-Specific Imaging Probe [($^{18}$)F] Fluorodeoxysorbitol Determined by PET/CT in Healthy Human Volunteers. *Mol Imaging Biol* 18, 782-787 (2016).

Werner, R. A., et al. Functional Renal Imaging with 2-Deoxy-2-($^{18}$)F-Fluorosorbitol PET in Rat Models of Renal Disorders. *J Nucl Med* 59, 828-832 (2018).

Werner, R. A., et al. Novel Functional Renal PET Imaging With $^{18}$F-FDS in Human Subjects. *Clin Nucl Med* 44, 410-411 (2019).

Li, Z. B., et al. The synthesis of $^{18}$F-FDS and its potential application in molecular imaging. *Mol Imaging Biol* 10, 92-98 (2008).

Hasegawa, K., Koshino, K. and Higuchi, T. Facile synthesis of 2-deoxy-2-[($^{18}$)F]fluorosorbitol using sodium borohydride on aluminum oxide. *J Labelled Comp Radiopharm* 64, 40-46 (2021).

Yao, S., et al. Infection imaging with $^{18}$F-FDS and first-in-human evaluation. *Nuclear medicine and biology* 43, 206-214 (2016).

Šljukić, B., Santos, D. M., Sequeira, C. A. and Banks, C. E. Analytical monitoring of sodium borohydride. *Analytical Methods* 5, 829-839 (2013).

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A method for preparing 2-deoxy-2-[$^{18}$F]fluoro-D-sorbitol ($^{18}$F-FDS), the method comprising:
   (a) providing an aliquot of 2-deoxy-2-[$^{18}$F]fluoro-D-glucose ($^{18}$F-FDG);
   (b) contacting the aliquot of $^{18}$F-FDG with a solid-supported borohydride source to form $^{18}$F-FDS; and
   (c) purifying the $^{18}$F-FDS by contacting the $^{18}$F-FDS formed in step (b) with a cation exchange resin comprising PS—H$^+$ or an anion exchange resin comprising PSHCO$_3$.

2. The method of claim 1, wherein the solid-supported borohydride source is selected from the group consisting of macroporous triethylammonium methylpolystyrene borohydride (MP-Borohydride), (polystyrylmethyl)trimethylammonium borohydride, sodium borohydride on aluminum oxide, and combinations thereof.

3. The method of claim 1, wherein the aliquot of $^{18}$F-FDG comprises a dose ranging from about 150 MBq to about 1500 MBq of $^{18}$F-FDG.

4. The method of claim 3, wherein the aliquot of $^{18}$F-FDG comprises a dose ranging from about 750 MBq to about 950 MBq of $^{18}$F-FDG.

5. The method of claim 1, wherein the solid-supported borohydride source comprises from about 150 mg to about 1,000 mg of triethylammonium methylpolystyrene borohydride (MP-Borohydride).

6. The method of claim 5, wherein the solid-supported borohydride source comprises from about 300 to about 500 mg triethylammonium methylpolystyrene borohydride (MP-Borohydride).

7. The method of claim 1, further comprising purifying the $^{18}$F-FDS by contacting the $^{18}$F-FDS formed in step (b) with one or more resins selected from the group consisting of a neutral alumina and a reverse phase resin, and combinations thereof.

8. The method of claim 7, wherein the neutral alumina comprises ALOX N.

9. The method of claim 7, wherein the reverse phase resin comprises a polystyrene/divinylbenezene copolymer.

10. The method of claim 1, wherein purified $^{18}$F-FDS has a pH ranging from about 5.5 to about 8.

11. The method of claim 10, wherein the purified $^{18}$F-FDS has a pH of about 6.

12. The method of claim 1, wherein the method is conducted at a temperature having a range between about 20° C. and about 50° C.

13. The method of claim 1, wherein the resin comprising triethylammonium methylpolystyrene borohydride (MP-Borohydride) is pre-equilibrated with water or an acidified aqueous solution.

14. The method of claim 13, wherein the acidified aqueous solution comprises acetic acid.

15. The method of claim 1, further comprising adding an aliquot of glucose to the aliquot of $^{18}$F-FDG.

16. The method of claim 1, wherein the $^{18}$F-FDS has a radiochemical purity of greater than about 90%.

17. The method of claim 1, wherein the method has a greater than about 60% radiochemical yield.

\* \* \* \* \*